Figure 2:
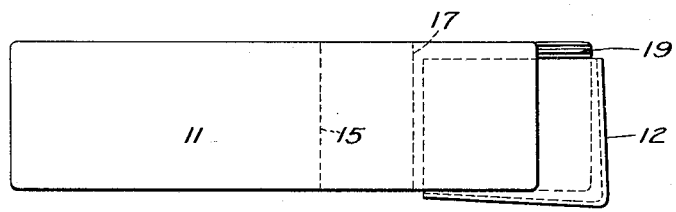

Dec. 8, 1931.  O. SEVERSON  1,835,992

COMBINED POST SHANK AND BIT

Filed March 24, 1928

Inventor

Ole Severson

By Attorneys

Nathan + Bowman

Patented Dec. 8, 1931

1,835,992

UNITED STATES PATENT OFFICE

OLE SEVERSON, OF SHELTON, CONNECTICUT, ASSIGNOR TO THE O. K. TOOL COMPANY, INC., OF NEW YORK, N. Y., A CORPORATION OF NEW YORK

COMBINED POST SHANK AND BIT

Application filed March 24, 1928. Serial No. 264,375.

An important step in the improvements of machine tool cutters was instituted upon the discovery and application of the idea of making a cutter tool with detachable cutter bits. This feature became more important as high speed alloys were gradually developed and improved. Such alloys, while possessing properties rendering them extremely well adapted for the purpose of providing cutting tool edges, were however, costly and extremely difficult to machine. The supporting holder, on the other hand, could be and preferably should be made of a softer material more easily machined but possessed of properties such as toughness and relative cheapness, which rendered the holder well adapted to perform the functions required thereof.

A serious problem, however, in the above noted construction arose from the fact that a cutter made from a plurality of parts was necessarily weakened and rendered less rigid than a solid, single piece cutter. This defect became more prominent as the special tool alloys were improved and became capable of withstanding more severe treatment and consequently engineers devoted their energies toward the idea of improving the means for securing the cutter bit in its holder.

A further feature or idea involved was that of making the cutter bit adjustable within the holder to provide for wear and regrinding. Any devices attempting to accomplish this result likewise had a tendency to weaken the construction.

A still further desideratum in the support of cutter tools was that of providing a rigid means for securing the cutter holder on the machine tool. Such a support usually consisted of a post or some type of fixture with screw threaded means thereon for clamping the holder on the post.

The present invention is concerned with all of the above problems, and has for its objects the provision of a combination of elements, some of which are well known to the art, but such elements being so organized that a single means is capable of both locking the cutter bit in its holder and simultaneously securing the holder on its supporting structure. In other words, the construction in one specific form consists of a combined post, shank and cutter bit, so related that the cutter bit is secured in its holder and the holder on the post by a single means and by a single operation.

The invention has the unusual and important feature, that normal forces acting on the cutter bit tend, not to loosen the elements, but rather to more securely lock both the cutter bit in its holder and also the holder on the supporting structure.

The construction also makes provision for means for adjusting the cutter bit in its holder in two directions to provide for the normal wear on the cutting edges.

The above functions are accomplished by the provision of a compact and simplified construction having fewer parts than constructions heretofore employed in an attempt to arrive at the ultimate results obtained in this invention.

The important and outstanding feature of the invention which makes possible the improvements noted consists of providing a shank or cutter bit holder with a split opening, the opening being tapered with the side walls thereof diverging outwardly. The cutter bit is tapered in a similar manner, whereby it receives a close wedging fit in the holder with, therefore, a maximum of bearing surface possible in such a construction. A screw stud in the supporting post is adjustable directly into engagement with a portion of the shank whereby this portion is sprung inwardly and the cutter bit is locked in position. The screw stud is also adjustable to vary the size of the opening and thereby the position of the cutter bit, the cutter bit, however, in any position receiving a close wedging fit in the holder. Adjustments transverse to the taper are provided for by the employment of serrations extending in the general direction of the taper. Release of the set screw, or screws, serves to permit the side walls of the split opening to diverge and to thereby release the cutter bit for ready removal or adjustment.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as a part of this disclosure and, in such drawings, like characters of reference denote corresponding parts throughout all the views, of which:—

Figure 1:
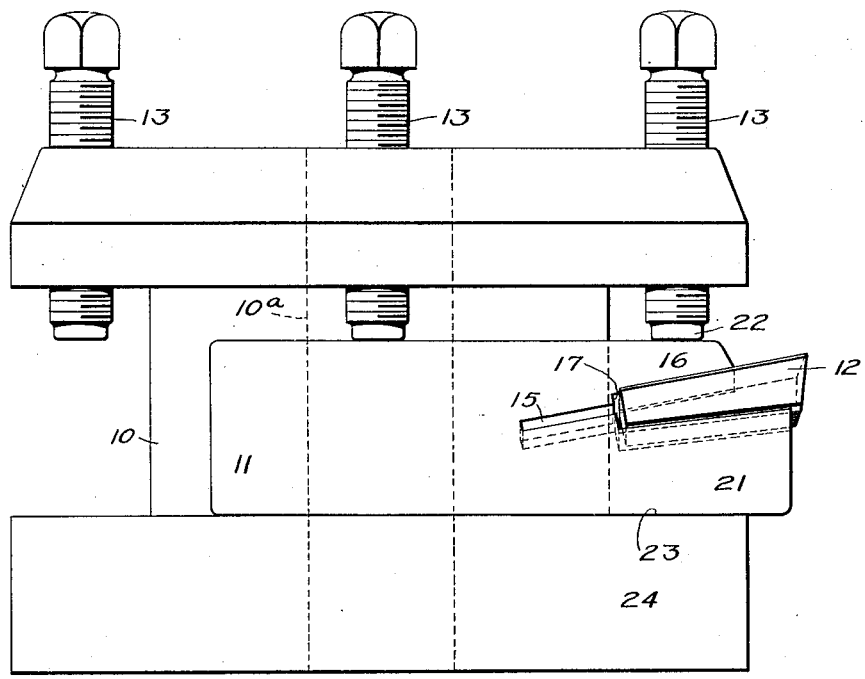
Figure 3:
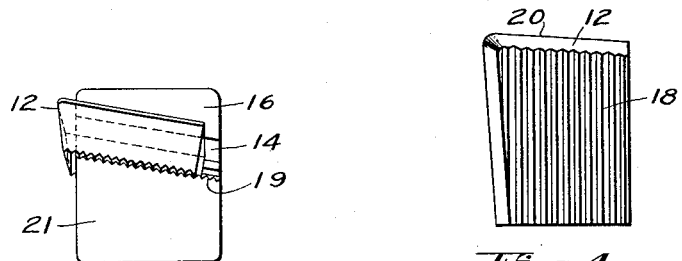
Figure 4:
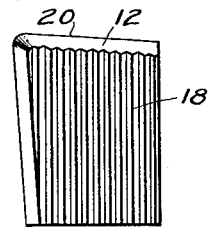

Figure 1 is a view in elevation showing the complete assembled unit. Fig. 2 is a top plan view of the shank and assembled cutter bit. Fig. 3 is an end view of the same, and Fig. 4 is a bottom view of a detached blade.

The invention as exemplified in the illustration includes a post 10 having supported thereon the shank 11 in which is secured the cutter bit 12. Screw studs 13 threaded through an overhanging portion are provided for securing the shank on the post and the cutter bit in the shank.

The post 10 illustrated is a common form of fixture adapted to be mounted on a machine tool, as for example on a small lathe turret or a lathe cross slide, or on a boring mill head. Several cutter tools may be mounted on the post. In the illustrated form, the post being square is thereby conveniently adapted to support four such cutter tools.

A common method of supporting the post on a machine tool is by means of a bolt extending axially thru a central opening as the opening 10$^a$ shown in dotted lines. Several holders 11 may be mounted on the post 10, the construction thereby constituting a small turret rotatable about the bolt extending thru the opening 10$^a$ and capable of being clamped in rotated position by means of a nut threaded on the supporting bolt. By this arrangement different types of cutter tools may be selectively presented to operate on the work piece.

The cutter bit 12 is mounted in a tapered opening 14 in the shank 11, said taper in the illustration shown extending substantially in the direction of the length of the shank. The inner portion of the opening consists of a reduced slot 15, the chief purpose of which is to render the upper portion 16 more capable of flexure, and furthermore permits the portion 16 to be moved inwardly without materially destroying or impairing the accuracy or relative angle of the taper as would be the case if the entire flexure took place about the shoulder 17.

Serrations 18, complemental to serrations 19 on the lower wall of the opening are provided, which permit of selective positioning of the cutter bit transverse to the shank. The relative directions and position of the slot may obviously be varied without departing from the main features of this invention. In the construction it is to be seen that the opening and, therefore, the cutter bit slope downwardly to the rear and to the right in Figure 3, which gives the cutter bit a rake angle usually desired in this type of cutter.

It may be perceived that forces acting on the outer cutting edge 20 of a cutter bit tend to force it inwardly and thereby more rigidly lock it in position. Such forces simultaneously tend to more securely lock the holder on the post since any tendency to spread the portions 16 and 21 tend to cause the holder to more firmly engage the abutting end 22 of the stud 13 and to bear more heavily on the platform surface 23 of the projecting base portion 24 of the post.

It is apparent that the present construction is very much simplified and consists of but few parts. The operation and adjustment of any of the elements may be quickly and easily accomplished. The cutter bit 12 is inserted in the desired position and the screw stud 13 turned into firm engagement, thereby simultaneously locking the cutter bit in the holder and the holder on the post. Thereafter the cutter bit may be easily removed or adjusted by operation of the readily accessible screw stud 13.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefor, such adaptations should be, and are intended to be, comprehended within the meaning and range of equivalency of the following claims:—

Having thus revealed this invention, I claim as new and desire to secure the following combinations and elements, or equivalents thereof, by Letters Patent of United States:—

1. A cutter tool combining a one-piece supporting shank comprising an elongated member having therein a tapered cutter-blade opening with the side walls diverging outwardly toward the blade-holding end and a reduced slot extending inwardly from the blade opening, a cutter blade fitted in said opening and adapted to be adjusted laterally of the supporting shank, said blade being similarly tapered to receive a wedging fit in said opening; and means for forcing at least one of said walls inwardly to vary the opening and to rigidly secure the cutter blade in the shank, said slot facilitating the springing of said wall and serving to maintain substantially the same angle between the walls of said opening.

2. A cutter tool combining a one-piece supporting shank comprising an elongated member having therein a tapered cutter-blade opening the side walls of which diverge outwardly toward the blade-holding end of the shank and a reduced slot extending inwardly from the blade opening, one of said side walls being formed with a series of serrations extending lengthwise of the shank; a serrated cutter blade fitted in said opening and adapted to be adjusted laterally of the supporting shank; said blade being similarly tapered to receive a wedging fit in said opening; and means for forcing at least one of said walls inwardly to vary the opening and to rigidly secure the cutter blade in the shank, said slot facilitating the springing of said wall and serving to maintain substantially the same angle between the walls of said opening.

3. A cutter tool as specified in claim 2 in which the cutter blade opening in the supporting shank is arranged at an angle relative to both the length and width of the cutter shank and extends from one side to the other thereof, thereby permitting the cutter blade to be projected from either side of the shank and to be adjusted simultaneously both vertically and horizontally.

In witness whereof, I hereunto subscribe my name.

OLE SEVERSON.